Dec. 18, 1951   W. A. HOPKINS ET AL   2,578,703
RADIATION DETECTION INSTRUMENT
Filed Dec. 13, 1949

Inventors
WILLIAM A. HOPKINS
HOWARD W. GILBERT
By
Attorney

Patented Dec. 18, 1951

2,578,703

UNITED STATES PATENT OFFICE 2,578,703

RADIATION DETECTION INSTRUMENT

William A. Hopkins, Columbus, Ohio, and
Howard W. Gilbert, Bethesda, Md.

Application December 13, 1949, Serial No. 132,768

4 Claims. (Cl. 250—71)

(Granted under the act of March 3, 1883, as
amended April 30, 1928; 370 O. G. 757)

This invention relates to devices for detecting the extent or magnitude of electromagnetic radiation within or adjacent any given area.

More particularly, the invention is concerned with a simple device that can be used by any person of normal intelligence to check or measure the degree of saturation of a particular zone by the alpha, beta and gamma rays that may be present following an atomic chain reaction, or the like.

The possible implications of atomic warfare necessitate the development of means and equipment for the protection of masses of people against atomic weapons. While the mechanical effects of an atomic bomb are readily apparent after an explosion, the insidious effects of radioactivity may not become evident until long after the explosion. It is to be anticipated that by the use of certain methods of detonating atomic bombs or by the use of other methods of releasing atomic energy, the effective radius of hazard due to radioactivity may extend well beyond the radius of blast damage. In order to protect personnel from the hazard of atomic radiation, it is necessary to know the extent and intensity of such radioactive contamination, which while having serious effects on the human body and on certain inert materials, is not detectable by any physical sense or sensation. It is necessary therefore to provide instruments which will detect and measure this radioactive contamination.

This invention affords an instrument which will detect and provide semi-quantitative measurements of electromagnetic or atomic radiation. The instrument has the advantages of low cost, compactness, ruggedness, long life and simplicity of operation. It is capable of being used by a novice, and is of such simplicity of design and operation as to be useable and available to all operating military and civilian personnel.

Equipment, of course, is now available for the detection and measurement of electromagnetic and atomic radiation, but it does not serve the purpose of the present invention. Examples of such equipment are the ionization chamber, the Geiger tube, film badges, electroscopes and fluorescent materials such as used in fluoroscopes. Instruments utilizing electronic circuits are necessarily large, cumbersome, and somewhat expensive, and require training for operation. Film badges require special processing before an indication of radiation intensity can be obtained and will not give immediate indications of the radiation intensity. Fluorescent screens require experience to interpret the intensity and type of radiation producing the fluorescense.

Accordingly, it is the primary object of the present invention to devise a simple instrument of the type above mentioned which can be produced cheaply for mass distribution. In this connection it is an object to produce an easily portable unit of substantially pocket size.

Another important object resides in the provision of a detection instrument that affords a quick measurement of radioactivity and, particularly, a gage that provides a comparison of illumination of radioactive material with a luminescent material of known luminosity.

These and further objects of the present invention should become clearly apparent from a study of the following detailed description when taken in conjunction with the accompanying drawing, wherein.

Figure 1:
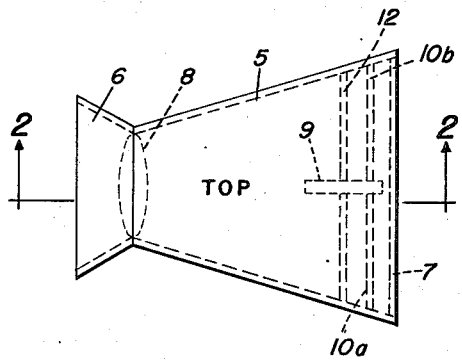
Fig. 1 is a top plan view of a suitable embodiment of the invention.
Figure 2:
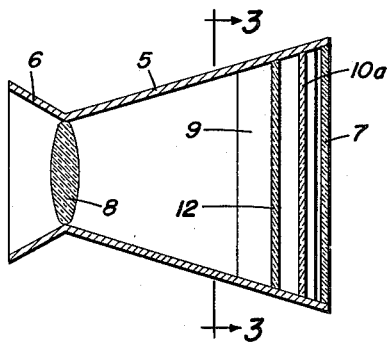
Fig. 2 represents a section taken upon the plane of line 2—2, Fig. 1.
Figure 3:
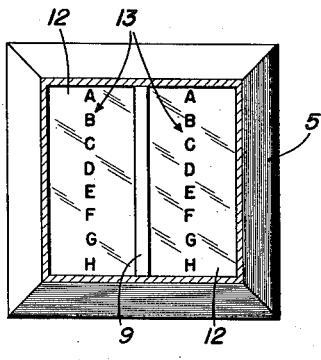
Fig. 3 is a sectional view taken upon the plane of line 3—3, Fig. 2.

With continued reference to the drawing, there is shown a casing, somewhat in the shape of a megaphone, comprising a body 5 having a funnel-like eyepiece 6. This casing preferably is formed of plastic material as a unitary structure, but of course it may be constructed of multiple elements and of other suitable materials. It is essential, only, that it be opaque and that its enlarged end have such shape as to accommodate two vertical rows of characters yet to be described. The enlarged end preferably is rectangular and is closed by a panel 7 that is opaque, but which, however, must not be impervious to rays within the range of radioactive transmission.

At its locus of minimum cross-sectional area the casing preferably is provided with a magnifying lens 8 to afford improved visibility from the eyepiece to a set of screens about to be described. The top of the casing may have the legend "top" thereon to insure correct use of the instrument.

In its normal position of use the casing is divided interiorly and centrally by a vertical plate 9 of lead or any other material that may be suitable to prevent lateral transfer of rays from radioactive sources.

Near the front end of the instrument there is a pair of fluorescent screens $10_a$, $10_b$, in the same plane but separated by the lead plate 9. One of the screens (either one) contains any known activator which causes it to fluoresce and thus it always produces constant light that is visible through the eyepiece 6. The other screen is non-activated but treated with radium or any known substance that causes it to glow from activation by any radioactive source outside the instrument and to a degree corresponding to the magnitude of such source. Hence, by comparing the known fluorescence of one screen with the externally activated luminescence of the other, the magnitude of the radioactive source can be roughly determined. To render this observation easier and more accurate, however, the instrument is further equipped as follows.

Behind the screens 10a, 10b and in parallelism therewith is disposed a pair of panels 12 one of which is semi-transparent and varies gradually in transparency from top to bottom, the other being fully transparent.

For example, the upper edge portion of the semi-transparent panel may be fully transparent, or substantially so, the remainder becoming translucent to varying degrees, and finally ranging into semi-opaqueness in the bottom edge portion.

Two identical sets of opaque characters 13, which may comprise letters (as shown), numerals, or any other suitable markings, are placed upon the panels 12 in vertical sequence. Each character of each set will appear with more or less vividness, depending upon the amount of light emitted from the screens 10a, 10b, and the characters of the two sets may be visually compared to obtain an approximate evaluation of the electromagnetic intensity if any is present.

It should be understood that the screens 10a, 10b and the panels 12 may be arranged horizontally instead of vertically; and that the panels 12 may decrease in transparency from bottom to top instead of from top to bottom. Also, it is contemplated that a plurality of differing fluorescent materials might be incorporated so that each would glow with individual color when exposed to radiation within a certain field of intensity.

The operation should now be fairly obvious. The instrument is held to one eye so as to exclude external light, the other eye of course being closed. Then, if radioactivity is present, its magnitude or the extent of its danger can be gaged by comparing the most vivid character of one set 13 with a standard character of the other set, in somewhat the same manner that light intensity is ascertained by a conventional photometer. It is considered that the idea of comparing the visual luminosity of two fluorescent screens, of providing means for the visual measurement of the luminosity, the incorporation of two parts of a screen to correct for variations in light sensitivity of the human eye, and the incorporation of all of the above features in a small compact case for the detection and measurement of electromagnetic and atomic radiations constitute features which are new.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. A pocket-size portable radiation detector comprising a casing having an eyepiece, a pair of screens disposed within said casing in one plane normal to the axis of vision and at opposite sides of said axis, one of said screens being inherently luminescent and the other being treated to glow when exposed to radioactivity, and a panel structure arranged between said eyepiece and said screens and in parallelism with the latter, the half of said panel structure associated with the inherently luminescent screen being of graduated transparency from one edge to an opposite edge, said panel structure carrying two series of opaque characters disposed in rows behind said screens.

2. A pocket-size portable radiation detector comprising a casing having an eyepiece, a pair of screens disposed within said casing in one plane normal to the axis of vision and at opposite sides of said axis, one of said screens being inherently luminescent and the other being treated to glow when exposed to radioactivity, and a longitudinally arranged plate separating said screens and being impervious to electromagnetic rays.

3. A pocket-size portable instrument of the class described comprising a small casing shaped approximately like a megaphone, the smaller end forming an eyepiece, a directly viewable screen near the large end of the casing normal to the axis of vision, said screen consisting of two substantially parallel portions of approximately equal size, one of said portions having a known or standardized degree of luminescence and the other embodying a substance that glows in the presence of radioactivity, and a panel disposed between said eyepiece and said screen, said panel having two sets of opaque characters thereon in opposed relationship behind said screen portions, and the portion of said panel disposed between said eyepiece and the portion of said screen having a known or standardized degree of luminescence being of graduated transparency.

4. In a radiation detection device having a casing enclosing a viewable screen one half of which is inherently luminescent and the other half of which is luminescent when irradiated, means for visually comparing the relative degree of radiation comprising a pair of transparent panels one each in the line of vision covering each half of said screen, the one over the half of the screen which is inherently luminescent being graduated in transparency from top to bottom, and both of said pair of panels having a vertical row of like opaque indicia whereby visual comparison may be made of the luminosity of the irradiated half of said screen in the area immediately adjacent the edge of any one of said indicia with the luminosity of the half of said screen having inherent luminescence in the area immediately adjacent a like indicia.

WILLIAM A. HOPKINS.
HOWARD W. GILBERT.

REFERENCES CITED

The following references are of record in the file of this patent:

UNITED STATES PATENTS

| Number | Name | Date |
|---|---|---|
| 788,151 | Hall | Apr. 25, 1905 |
| 1,242,377 | Schmidt | Oct. 9, 1917 |
| 1,990,022 | DuMond et al. | Feb. 5, 1935 |